United States Patent [19]
Sarbell

[11] Patent Number: 6,099,170
[45] Date of Patent: Aug. 8, 2000

[54] SPLICE PROTECTION SLEEVE FOR A PLURALITY OF OPTICAL FIBERS AND METHOD OF INSTALLATION

[75] Inventor: John P. Sarbell, Grand Island, Fla.

[73] Assignee: Thomas & Betters International, Inc., Sparks, Nev.

[21] Appl. No.: 09/227,014

[22] Filed: Jan. 7, 1999

[51] Int. Cl.[7] .................................................. G02B 6/255
[52] U.S. Cl. ................................................. 385/99; 385/95
[58] Field of Search .............................. 385/95–99, 100, 385/114, 135; 65/407

[56] References Cited

U.S. PATENT DOCUMENTS

| | | | |
|---|---|---|---|
| 4,172,746 | 10/1979 | Le Noane et al. ................... | 156/96.22 |
| 4,220,619 | 9/1980 | Kersten ................................... | 264/230 |
| 4,374,881 | 2/1983 | Hamilton ........................... | 428/DIG. 8 |
| 4,509,820 | 4/1985 | Murata et al. ....................... | 350/96.21 |
| 4,590,328 | 5/1986 | Kunze .......................... | 174/DIG. 88 R |
| 4,699,454 | 10/1987 | Priaroggia ............................ | 350/96.21 |
| 4,722,588 | 2/1988 | Priaroggia ............................ | 350/96.21 |
| 4,881,995 | 11/1989 | Arenz ........................................ | 156/52 |
| 4,997,689 | 3/1991 | Langen et al. .......................... | 428/34.9 |
| 5,440,665 | 8/1995 | Ray et al. ................................ | 385/135 |
| 5,528,718 | 6/1996 | Ray et al. ................................ | 385/136 |
| 5,533,161 | 7/1996 | Atkeisson et al. ......................... | 385/99 |
| 5,548,672 | 8/1996 | Hattori et al. ............................ | 385/43 |
| 5,627,930 | 5/1997 | Ishiguro et al. ........................... | 385/51 |
| 5,706,380 | 1/1998 | Le Noane et al. ......................... | 385/95 |
| 5,710,850 | 1/1998 | Watanabe et al. .................... | 385/71.84 |
| 5,731,051 | 3/1998 | Fahey et al. ............................ | 428/34.9 |
| 5,832,162 | 11/1998 | Sarbell ...................................... | 385/99 |

*Primary Examiner*—Phan T. H. Palmer
*Attorney, Agent, or Firm*—G. Andrew Barger

[57] ABSTRACT

A sleeve and method are provided for protecting a splice of an optical fiber. The sleeve includes a support member and a plurality of optical fibers with the splice and being adjacent the support member. A heat deformable inner tube encompasses each of the plurality of optical fibers at the splice and a heat deformable outer tube encompasses at least partially the support member, the plurality of optical fibers at the splice, and each of the inner tubes. The method includes the acts of sliding the sleeve over a first free end of a plurality of optical fibers such that one of the inner tubes encompasses each of the fibers and then splicing the first free end of the plurality of optical fibers to a corresponding second free end of the plurality of optical fibers. Subsequently, the sleeve is slide over the splice of the first and second free ends and heat is applied to the sleeve to further strengthen the splice upon cooling.

20 Claims, 2 Drawing Sheets

SPLICE PROTECTION SLEEVE FOR A PLURALITY OF OPTICAL FIBERS AND METHOD OF INSTALLATION

FIELD OF THE INVENTION

In general, the present invention relates to optical fibers and, in particular, the present invention relates to a splice protection sleeve for a plurality of optical fibers and method of installation.

BACKGROUND

In 1980, U.S. Pat. No. 4,220,619 to Kersten was issued that provided a process for forming a connection between two groups of glass fibers by having the groups abut ends and separating them about a star-type center support. The fibers were then held in place by an outer shrink tube that was shrunk around the center support. The '619 patent requires a very costly and time consuming tool to couple the groups of glass fibers and serves to create the splice as opposed to protecting the splice after it is made. What's more, inner tubes are not provided to surround and strengthen the splice once made.

Current splice protection systems, as shown in FIG. 2, have a sleeve 20 with an outer tube 22 and an inner tube 24 constructed of melt flow material for receiving a singular, spliced optical fiber therein. A center support member 26 adds strength to the sleeve and prevents the singular optical fiber from breaking. A heat source is typically used to raise the temperature of the melt flow material of the inner tube, which uses a set amount of battery energy and time. This has proven costly and time consuming when a plurality of optical fibers, which have been spliced, must be protected such as is often the case in the telecommunications industry.

It would therefore be advantageous to have a sleeve and method of installing the sleeve that allows a plurality of optical fibers to be protected within the outer tube of the sleeve of same diameter and length as the single-fiber sleeve thereby using the same amount of battery energy and shrink time to protect a plurality of optical fibers as formerly required to protect a singular fiber. It would also be desirable to have the plurality of inner tubes, encompassing the plurality of optical fibers, to abut one another. Therefore, when the heat source is applied to the sleeve, the inner tubes melt flow together, yet provide individual encapsulation of each fiber thereby providing greater rigidity at the splice and thus increased protection for the spliced optical fibers therein upon removal of the heat source.

SUMMARY OF THE INVENTION

The present invention eliminates the above difficulties and disadvantages by providing a sleeve and method for protecting a splice of an optical fiber. The sleeve includes a support member and a plurality of optical fibers having the splice adjacent the support member. A heat deformable inner tube encompasses each of the plurality of optical fibers at the splice and a heat deformable outer tube encompasses at least partially the support member, the plurality of optical fibers at the splice, and each of the inner tubes.

Another advantage of the present sleeve is that only one support member is centered among the plurality of optical fibers thereby protecting all of the plurality of optical fibers from being bent or broke at the splice. The heat deformable inner tube is comprised of a melt flow adhesive while the heat deformable outer tube is comprised of a heat shrink material. Further, the inner tubes of each of the plurality of optical fibers abut within the outer tube such that when heat is applied to the sleeve the inner tubes melt flow into one another and the splice of the plurality of optical fibers, yet the inner tubes provide individual encapsulation of each fiber thereby providing greater rigidity at the splice. The splice is preferably a fusion splice of the optical fibers.

The present invention further includes a method for protecting the splice of the optical fiber. The method includes the acts of sliding the sleeve over a first end of a plurality of optical fibers and then splicing the first free end of the plurality of optical fibers to a corresponding second free end of the plurality of optical fibers. Subsequently, the sleeve is slide over the splice of the first and second free ends and heat is applied to the sleeve.

A further advantage of the present method is that a heat deformable inner tube encompasses each of the plurality of optical fibers at the splice and the sleeve comprises a heat deformable outer tube encompassing the plurality of optical fibers at the splice. Also, the sleeve includes a heat deformable inner tube encompassing each of the plurality of optical fibers and a heat deformable outer tube encompassing the inner tubes at the splice. The sleeve further includes a support member around which the spliced first and second free ends of the plurality of optical fibers are disposed.

A still further advantage of the present method is that the heat deformable inner tubes of each of the plurality of optical fibers abut within the outer tube such that when heat is applied to the sleeve the inner tubes melt flow into one another and the splice of the plurality of optical fibers, yet the inner tubes provide individual encapsulation of each fiber thereby providing greater rigidity at the splice.

DETAILED DESCRIPTION OF THE PREFERRED EMBODIMENT(S)

Figure 1:
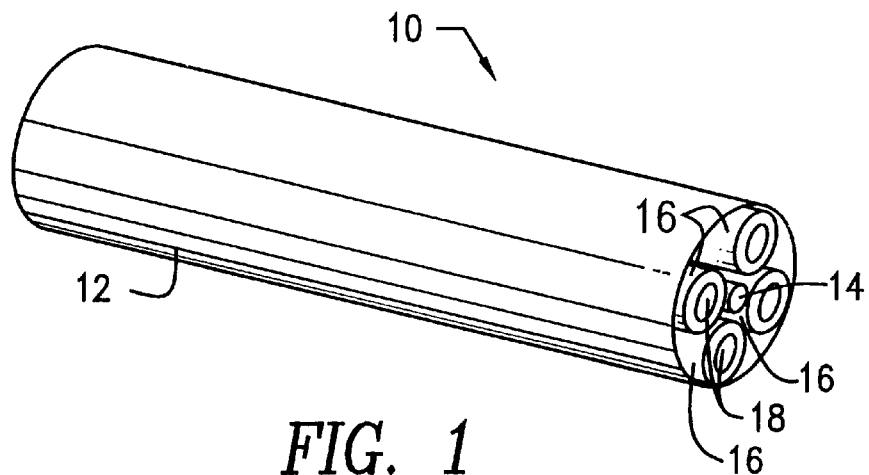
FIG. 1 is a perspective view of a sleeve of the present invention showing a plurality of spliced, optical fibers each encompassed by inner tubes.
Figure 2:
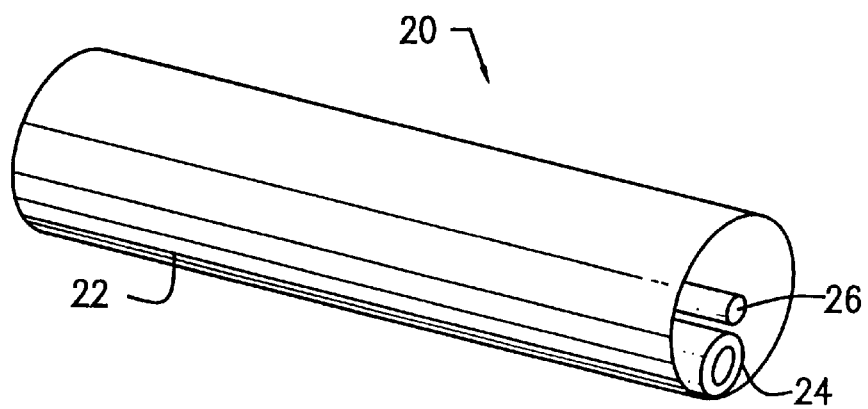
FIG. 2 is a perspective view of a prior sleeve.
Figure 4:
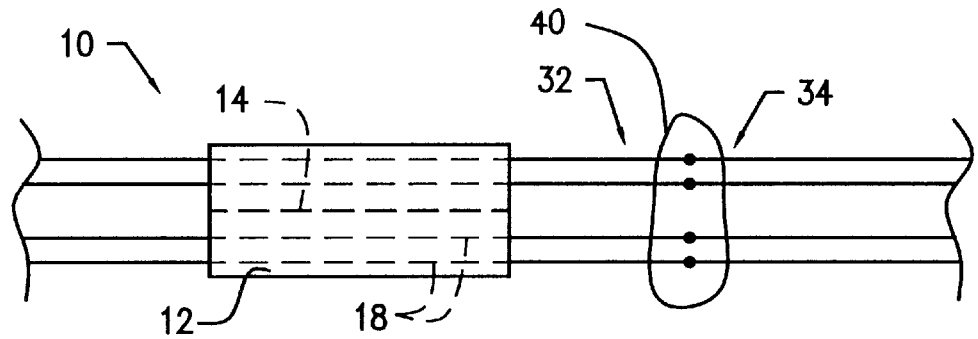
FIG. 4 is a side elevational view of the present sleeve and method act of the first end spliced with the second free end of the plurality of optical fibers.
Figure 5:
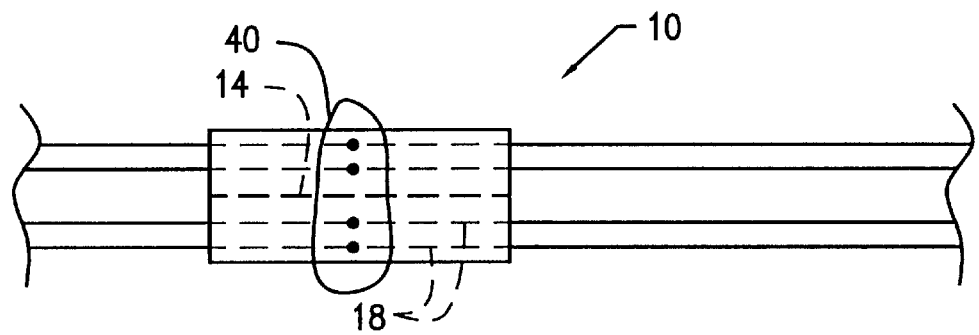
FIG. 5 is a side elevational view of the present sleeve and method act of the sleeve being slid over the spliced ends of the plurality of optical fibers.

The above and other features, aspects, and advantages of the present invention will now be discussed in the following detailed description and appended claims, which are to be considered in conjunction with the accompanying drawings in which identical reference characters designate like elements throughout the views. Shown in FIG. 1 is a sleeve 10 for protecting a splice 40, which is shown in FIGS. 4 and 5, of an optical fiber 18. The splice 40 is preferably a fusion splice. The sleeve 10 has a support member 14, which is preferably a metal rod but could also be of a hard plastic or other rigid material, to provide support to the sleeve 10 and prevent the sleeve 10 from being bent, crimped, or folded.

Figure 3:
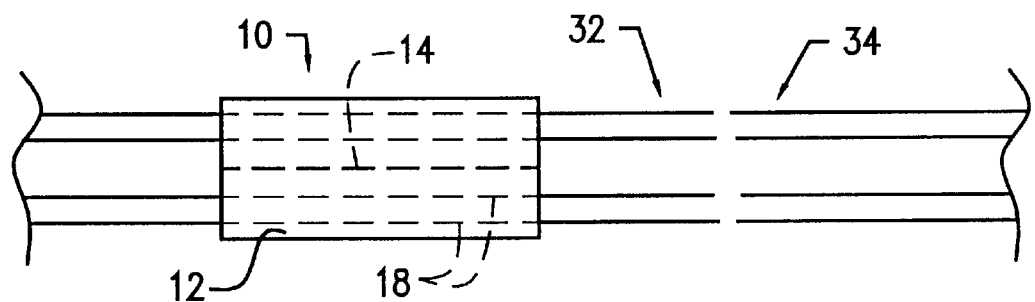
FIG. 3 is a side elevational view of the present sleeve and method act of the sleeve slid over a first free end of the plurality of optical fibers.

Disposed in the sleeve 10 are a plurality of optical fibers 18 for carrying light energy each having a first free end 32 and a second free end 34 that are spliced together, as shown in FIGS. 3–5. Each of the plurality of optical fibers 18 are adjacent the center support member 14 within the sleeve 10 as is best shown in FIG. 1, which keeps the optical fibers 18 from being bent or broken within the sleeve 10. It is also known that the highest fragility point of the optical fibers 18 is at the splice 40, which is primarily protected within the sleeve 10. Each of the optical fibers 18 has an acrylate coating integrally formed thereon to protect the fiber from scratches or abrasions.

Further included in the sleeve 10 are heat deformable inner tubes 16 encompassing the plurality of optical fibers 18 at least at the splice 40. The inner tubes 16 are transparent and comprised of a melt flow adhesive, which is preferably ethylene-vinyl acetate, but could also be another melt flow adhesive such as ethylene-ethyl acrylate copolymer. The heat deformable inner tubes 16 of each of the plurality of optical fibers 18 abut within the outer tube 12, as is best shown in FIG. 1, such that when heat is applied to the sleeve 10 the inner tubes 16 melt flow into one another and the splice 40 of the plurality of optical fibers 18. Simultaneously, a hoop-stress is created individually around each splice 40 further strengthening the rigidity of the sleeve 10 and providing greater protection for the splice 40.

A heat deformable outer tube 12 encompasses, at least partially, the support member 14, the plurality of optical fibers 18 at the splice 40, and each of the inner tubes 16. The outer tube 12 is also transparent and is comprised of a heat shrink material, which is preferably polyolefin, but could also be polyvinyl chloride or polyethylene. When a heat source is applied to the sleeve 10, the outer tube 12 begins to shrink at approximately ninety degrees Centigrade and, simultaneously, the inner tubes 16 begin to melt flow into each other and the splice 40 of each optical fiber 18.

Figure 6:
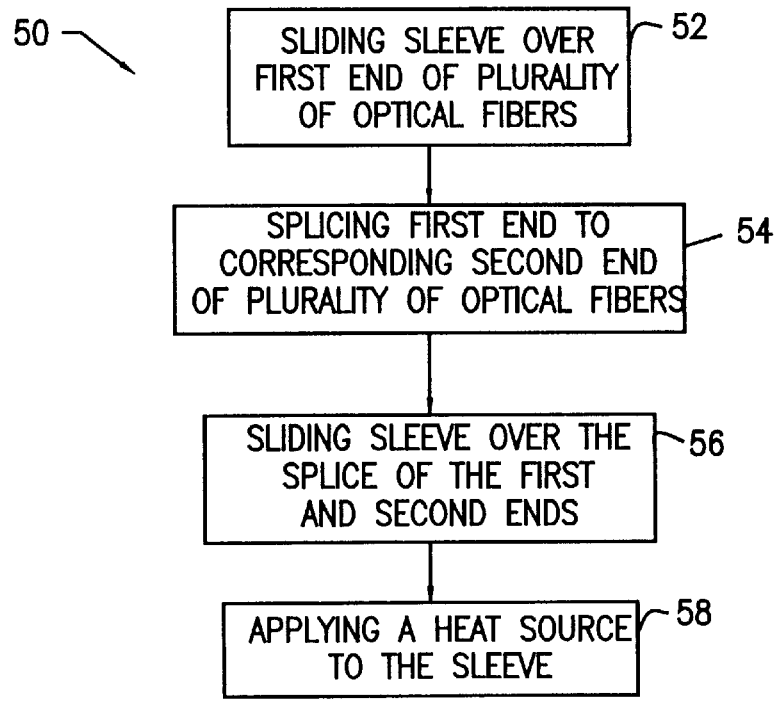
FIG. 6 is a flow chart of the method acts of the present invention.

As graphically shown in FIGS. 3–5 and in the flow chart of acts of FIG. 6, a method 50 of installation for the sleeve 10 is provided for protecting the fusion splice 40 of a plurality optical fibers 18. The method 50 begins in block 52 with the act of sliding the sleeve 10 over a first free end 32 of a plurality of optical fibers 18, as shown in FIG. 3. To accomplish this, each of the fibers 18 is inserted into one of the inner tubes 16 at the first free end 32. The method 50 then falls to block 54 where the first free end 32 of the plurality of optical fibers 18 is preferably fusion spliced to a corresponding second free end 34 of the plurality of optical fibers 18, as depicted in FIG. 4.

The method 50 next falls to block 56 and the act of sliding the sleeve 10 over the splice 40 of the first and second free ends 32, 34 is carried out, as shown in FIG. 5. The inner tubes 16 are now positioned such that they are encompassing the splice 40 of the optical fibers 18. To complete installation of the sleeve 10, the method 50 falls to block 58 whereby the act of applying heat to the sleeve 10 is carried out such that the inner tubes 16 melt flow into one another and the splice 40 of the plurality of optical fibers 18, which upon cooling further strengthens the rigidity of the sleeve 10 as discussed above.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above mentioned description is to be considered exemplary, rather than limiting, and the true scope of the invention is that defined in the following claims.

What is claimed is:

1. A sleeve for protecting a splice of an optical fiber, the sleeve comprising:
   a support member;
   a plurality of optical fibers having the splice and being adjacent the support member;
   a heat deformable inner tube encompassing each of the plurality of optical fibers at the splice; and
   a heat deformable outer tube encompassing at least partially the support member, the plurality of optical fibers at the splice, and each of the inner tubes.

2. The sleeve of claim 1 wherein the heat deformable outer tube is comprised of a heat shrink material.

3. The sleeve of claim 2 wherein the heat shrink material is comprised of polyolefin.

4. The sleeve of claim 2 wherein the heat shrink material is comprised of polyvinyl chloride.

5. The sleeve of claim 1 wherein when heat is applied to the sleeve the inner tubes melt flow providing individual encapsulation of each fiber thereby providing greater rigidity at the splice.

6. The sleeve of claim 5 wherein the melt flow adhesive consists of ethylene-vinyl acetate.

7. The sleeve of claim 1 wherein the support member is centered among the plurality of optical fibers.

8. The sleeve of claim 1 wherein the support member is a metal rod.

9. The sleeve of claim 1 wherein each of the heat deformable inner tubes of each of the plurality of optical fibers abut at least one other inner tube within the outer tube such that when heat is applied to the sleeve the inner tubes melt flow into one another and the splice of the plurality of optical fibers thereby strengthening rigidity of the sleeve upon cooling.

10. The sleeve of claim 1 wherein the splice is a fusion splice.

11. A method for protecting a plurality of optical fibers each having a splice, the method comprising the steps of:
   sliding a sleeve over a first free end of the plurality of optical fibers and such that each of the plurality of optical fibers is encompassed by a heat deformable inner tube;
   splicing the first free end of the plurality of optical fibers to a corresponding second free end of the plurality of optical fibers;
   sliding the sleeve over the splice of the first and second free ends; and
   applying heat to the sleeve.

12. The method of claim 11 wherein when heat is applied to the sleeve the inner tubes melt flow providing individual encapsulation of each fiber thereby providing greater rigidity at the splice.

13. The method of claim 12 wherein the heat deformable inner tubes consist of ethylene-vinyl acetate.

14. The method of claim 11 wherein the sleeve is transparent.

15. The method of claim 14 wherein the heat deformable outer tube is comprised of polyolefin.

16. The method of claim 11 wherein the heat deformable inner tubes of each of the plurality of optical fibers abut within the outer tube such that when heat is applied to the sleeve the inner tubes melt flow into one another and the splice of the plurality of optical fibers.

17. The method of claim 11 wherein the splice is a fusion splice.

18. The method of claim 11 wherein the sleeve comprises a heat deformable outer tube encompassing the inner tubes at the splice.

19. The method of claim 11 wherein the sleeve further includes a support member around which the inner tubes are disposed.

20. A method for protecting a plurality of optical fibers each having a fusion splice, the method comprising the steps of:

sliding a sleeve over a first free end of a plurality of optical fibers, the sleeve comprising:
- a heat deformable inner tube encompassing each of the plurality of optical fibers at the splice such that each of the heat deformable inner tubes abut at least one other inner tube,
- a heat deformable outer tube encompassing the inner tubes at the splice, and
- a support member around which the plurality of optical fibers are disposed;

splicing the first free end of the plurality of optical fibers to a corresponding second free end of the plurality of optical fibers;

sliding the sleeve over the splice of the first and second free ends; and applying heat to the sleeve such that the inner tubes melt flow into one another and the splice of the plurality of optical fibers and simultaneously provide individual encapsulation of each fiber thereby providing greater rigidity at the splice.

* * * * *

UNITED STATES PATENT AND TRADEMARK OFFICE
CERTIFICATE OF CORRECTION

PATENT NO : 6,099,170
DATED : August 8, 2000
INVENTOR(S): John P. Sarbell

It is certified that error appears in the above-identified patent and that said Letters Patent are hereby corrected as shown below:

<u>In the Assignee</u>:

Line 1, delete " Thomas & Betters" and insert --Thomas & Betts--.

Signed and Sealed this

Twenty-fourth Day of April, 2001

Attest:

NICHOLAS P. GODICI

*Attesting Officer*    *Acting Director of the United States Patent and Trademark Office*